United States Patent

Gabbi et al.

[11] Patent Number: 5,727,673
[45] Date of Patent: Mar. 17, 1998

[54] APPARATUS FOR TRANSPORTING MECHANICAL PIECES

[75] Inventors: Luca Gabbi, Imola; Pier Paolo Nanni, Bologna, both of Italy

[73] Assignee: Marposs Societá Per Azioni, Bentivoglio, Italy

[21] Appl. No.: 605,004

[22] PCT Filed: Oct. 4, 1994

[86] PCT No.: PCT/EP94/03279

§ 371 Date: Mar. 12, 1996

§ 102(e) Date: Mar. 12, 1996

[87] PCT Pub. No.: WO95/10469

PCT Pub. Date: Apr. 20, 1995

[30] Foreign Application Priority Data

Oct. 15, 1993 [IT] Italy ................. B093A0406

[51] Int. Cl.[6] ................................. B65G 25/00
[52] U.S. Cl. ................................... 198/774.3
[58] Field of Search .............. 198/774.3, 774.1, 198/774.2, 774.4

[56] References Cited

U.S. PATENT DOCUMENTS

| | | | |
|---|---|---|---|
| 4,042,104 | 8/1977 | Fulette et al. | |
| 4,155,443 | 5/1979 | Schuright | 198/774.3 |
| 4,586,253 | 5/1986 | Souchi et al. | 198/774.3 |
| 5,033,609 | 7/1991 | Long | 198/774.3 |
| 5,449,062 | 9/1995 | McTaggart | 198/774.3 |

FOREIGN PATENT DOCUMENTS

| | | |
|---|---|---|
| 539649 | 4/1992 | European Pat. Off. |
| 2510530 | 2/1983 | France. |
| 2045191 | 10/1980 | United Kingdom. |

*Primary Examiner*—Joseph E. Valenza
*Attorney, Agent, or Firm*—Dickstein Shapiro Morin & Oshinsky LLP

[57] ABSTRACT

An apparatus for transporting elongated mechanical pieces, in particular connecting rods (B), comprising supporting bars (15, 15') for supporting the larger ends (T) of the connecting rods (B), the latter being arranged side by side along a longitudinal feed direction, and a displacement means (20-38) for the step by step feed of the connecting rods (B). In order to prevent undesired displacements that could cause the pieces (B) to fall from the supporting bars (15, 15'), the latter have sawtooth profile resting surfaces (16, 16') for constraining the position of the big ends (T) of the connecting rods (B) on the bars (15, 15'). Lateral displacements of the connecting rods (B) are prevented by a Vee guide surface for the resting of the small ends (P) of the connecting rods (B).

9 Claims, 3 Drawing Sheets

APPARATUS FOR TRANSPORTING MECHANICAL PIECES

TECHNICAL FIELD

The present invention relates to an apparatus for transporting elongated mechanical pieces having one larger end, in particular for transporting connecting rods along at least a longitudinal feeding direction, comprising a support structure, a pair of upper supporting bars coupled to the support structure, the supporting bars being mutually parallel and defining upper resting surfaces, for supporting the larger ends of the mechanical pieces, lower longitudinal guiding elements coupled to the support structure and arranged between the upper bars and beneath them, for defining constraint surfaces for cooperating along transversal directions with second end portions of the mechanical pieces, a pair of feeding bars, parallel to the supporting bars, for performing cyclic displacements with respect to the support structure and cooperating with the mechanical pieces, and at least one motor and mechanical transmission elements coupled to the feeding bars for controlling said cyclic displacements.

BACKGROUND ART

The known apparatuses for transporting mechanical pieces having a particular geometrical shape, like connecting rods, are arranged, for example, next to machine tools or measuring machines, in particular at the exit of said machines, where the piece machining or measuring operations have been performed.

Some known apparatuses for checking connecting rods include a piece support and guide structure and a feed device with elements that, by performing a cyclic displacement with respect to the support structure, cause the step by step feed of the connecting rods.

U.S. Pat. No. 4,042,104 discloses an apparatus of this kind, wherein the connecting rods are supported, at their larger end, or big end, by a pair of upper longitudinal rail members, and, at the opposite end, or small end, by a movable lower bar that causes the step by step feed.

Another known method involves a structure similar to that disclosed in U.S. Pat. No. 4,042,104, but foresees a different embodiment of the feed device. According to this method, schematically shown in FIG. 1, the connecting rods B, each consisting of a big end T, an elongated portion F and a small end P, are supported by a pair of upper guide and support bars 2 and laterally constrained by a pair of flat bars 3, both of said pairs being fixed with respect to a support structure, not shown in the figure. A pair of movable additional bars 4, parallel to the upper bars 2, is coupled to drive and transmission devices, not shown, for performing cyclic translation displacements, according to the trajectory indicated by the arrows, upwards, forwards (arrow A), downwards and backwards, for the step by step feed of the connecting rods B. The big ends T are raised by the movable bars 4, brought forward, and placed upon the guide bars 2 again. The lower flat bars 3 cooperate with the small ends P of the connecting rods, and serve to limit both the transversal and the rotary displacements of the pieces B. The function of the flat bars 3 is fundamental as, in the course of the step by step feed displacement and owing to the vibrations of the apparatus, the pieces B are subject to unbalances and these, in absence of transversal limit stops might cause rotational displacements and fall of the pieces through the upper bars 2 (and 4).

A disadvantage of the apparatus shown in FIG. 1 is the need to adjust, as the dimensions of the pieces to be transported change, the mutual position of the flat bars 3 because, in order to ensure the proper "antirotation" constraint of the pieces B, it is necessary that the transversal clearance between the small ends P and the flat bars 3, also in view of the limited thickness of pieces B, be limited as far as possible. This requirement implies the use of adjusting devices that increase the complexity and the costs of the transporting apparatus, and involve a considerable amount of time for performing the associated operations. The hereinbefore mentioned disadvantages are particularly serious and burdensome when the transporting apparatus foresees, instead of the transporting of the pieces along a single direction, the feeding along a plurality of pairs of guide and support bars as, for example, in the so-called "selecting devices" located at the exit of a measuring machine, in which each piece is selectively loaded on a well defined pair of guide bars, depending on the outcomes of the measuring operations. In these cases the previously mentioned disadvantages, as compared to a single transporting system, increase considerably.

DISCLOSURE OF THE INVENTION

Object of the present invention is to provide a transporting apparatus that overcomes the disadvantages of the known apparatuses, o as to be utilized without any need of performing long and delicate adjustment operations for transporting similar pieces with nominal dimensions that vary within a broad range.

This and other objects are achieved by an apparatus wherein the lower longitudinal guiding elements define a lower resting surface with a substantially Vee cross-section, that defines the constraint surfaces and said upper resting surfaces define mechanical references for determining the longitudinal position of the larger ends of the pieces on the upper supporting bars.

An advantage offered by the system according to the present invention is the extremely simple structure of the apparatus, as illustrated in the following description.

BRIEF DESCRIPTION OF THE DRAWINGS

The invention is now described with reference to the enclosed drawings, given by way of non-limiting example, wherein.

BEST MODE FOR CARRYING OUT THE INVENTION

Figure 1:
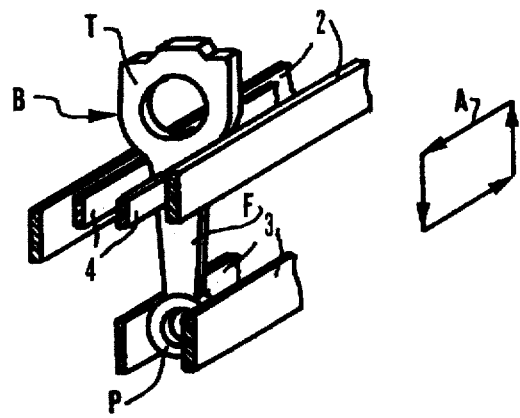
FIG. 1 is a very schematic perspective view showing the operating principle of a known transporting apparatus.
Figure 2:
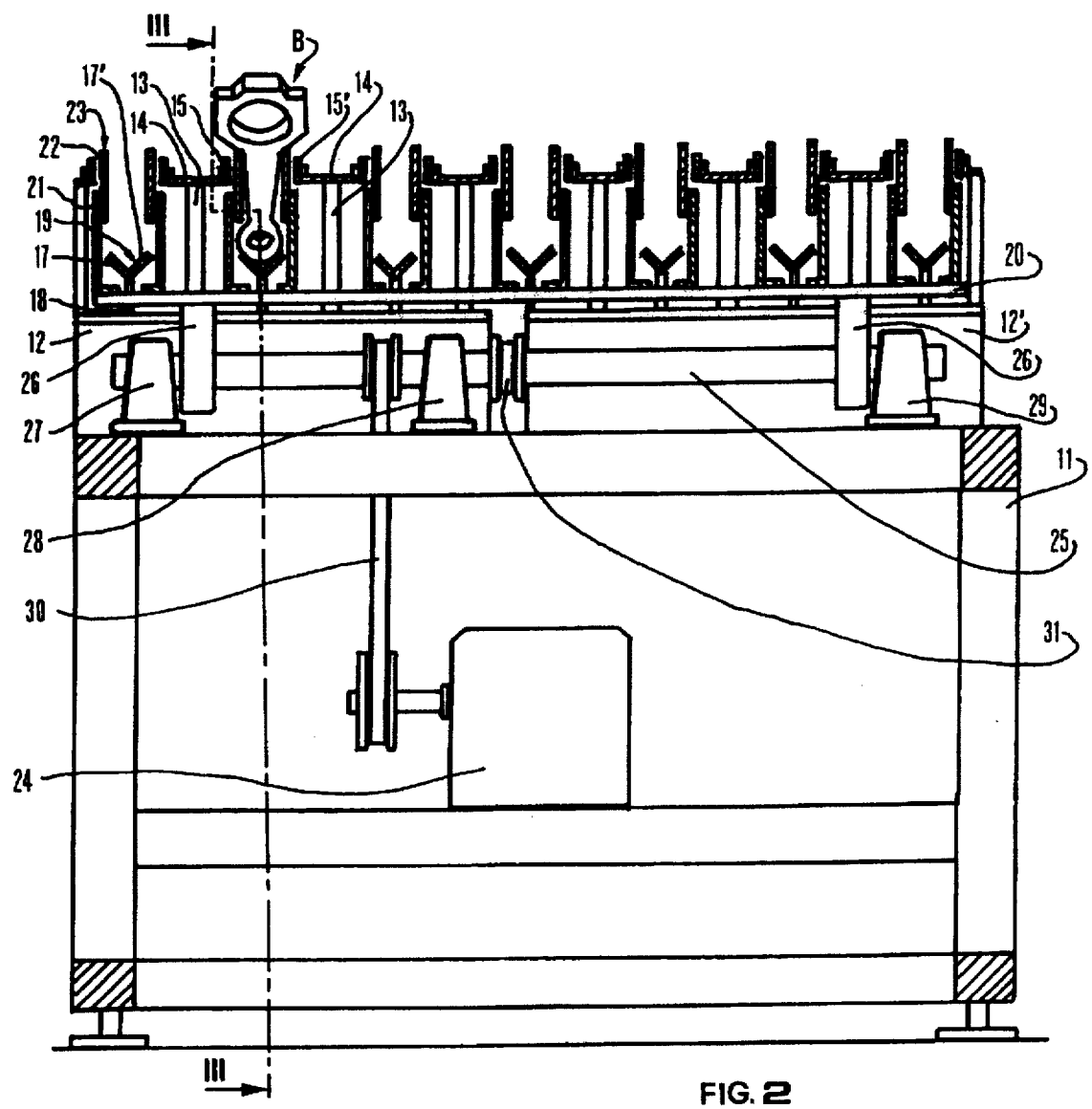
FIG. 2 is a cross-sectional view of a transporting system comprising several apparatuses according to the present invention, viewed along path II—II in FIG. 3.
Figure 3:
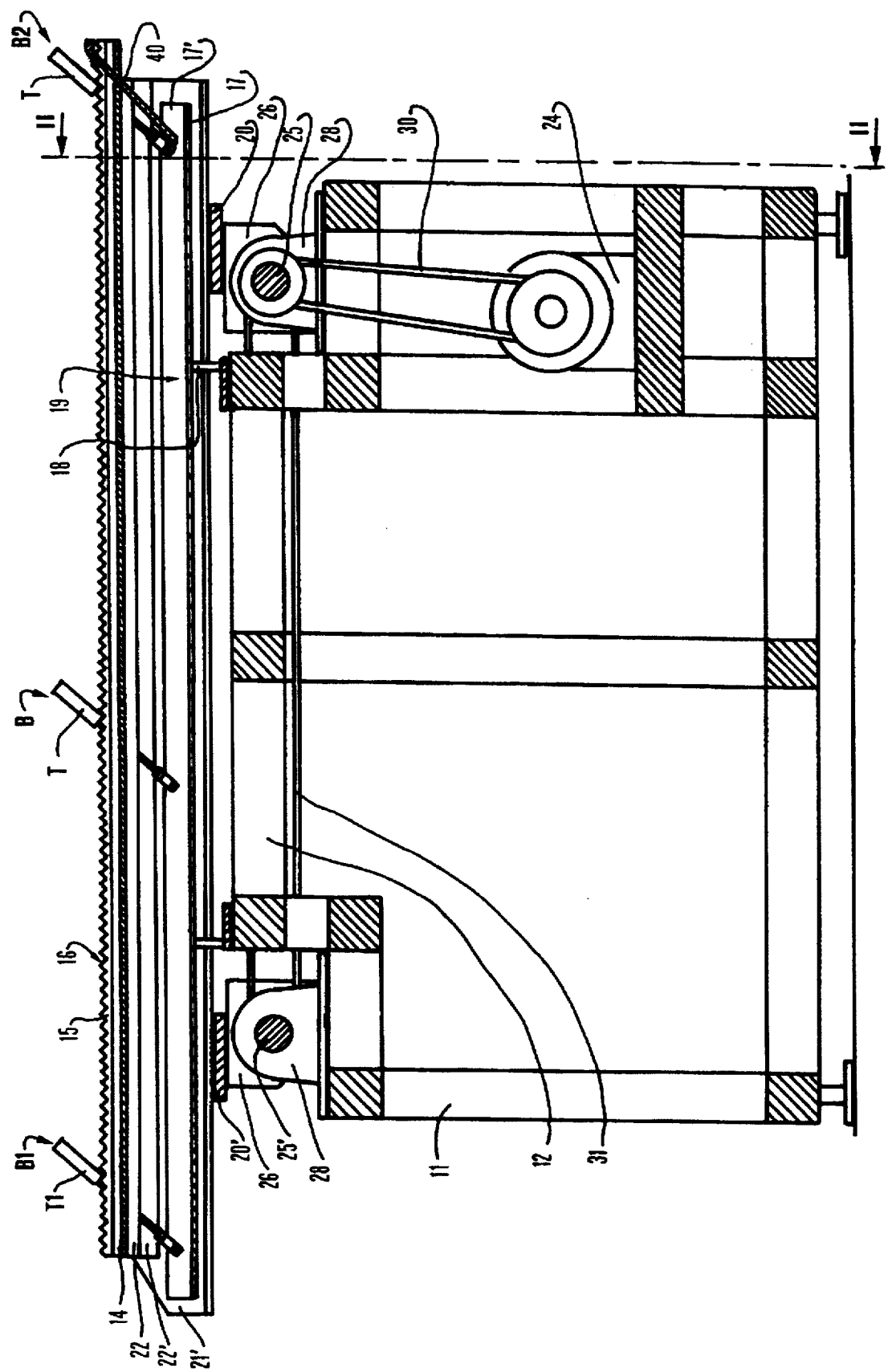
FIG. 3 is a longitudinal cross-sectional view of the transporting system shown in FIG. 2, viewed along path III—III in FIG. 2, at a different phase of operation.
Figures 4, 5:
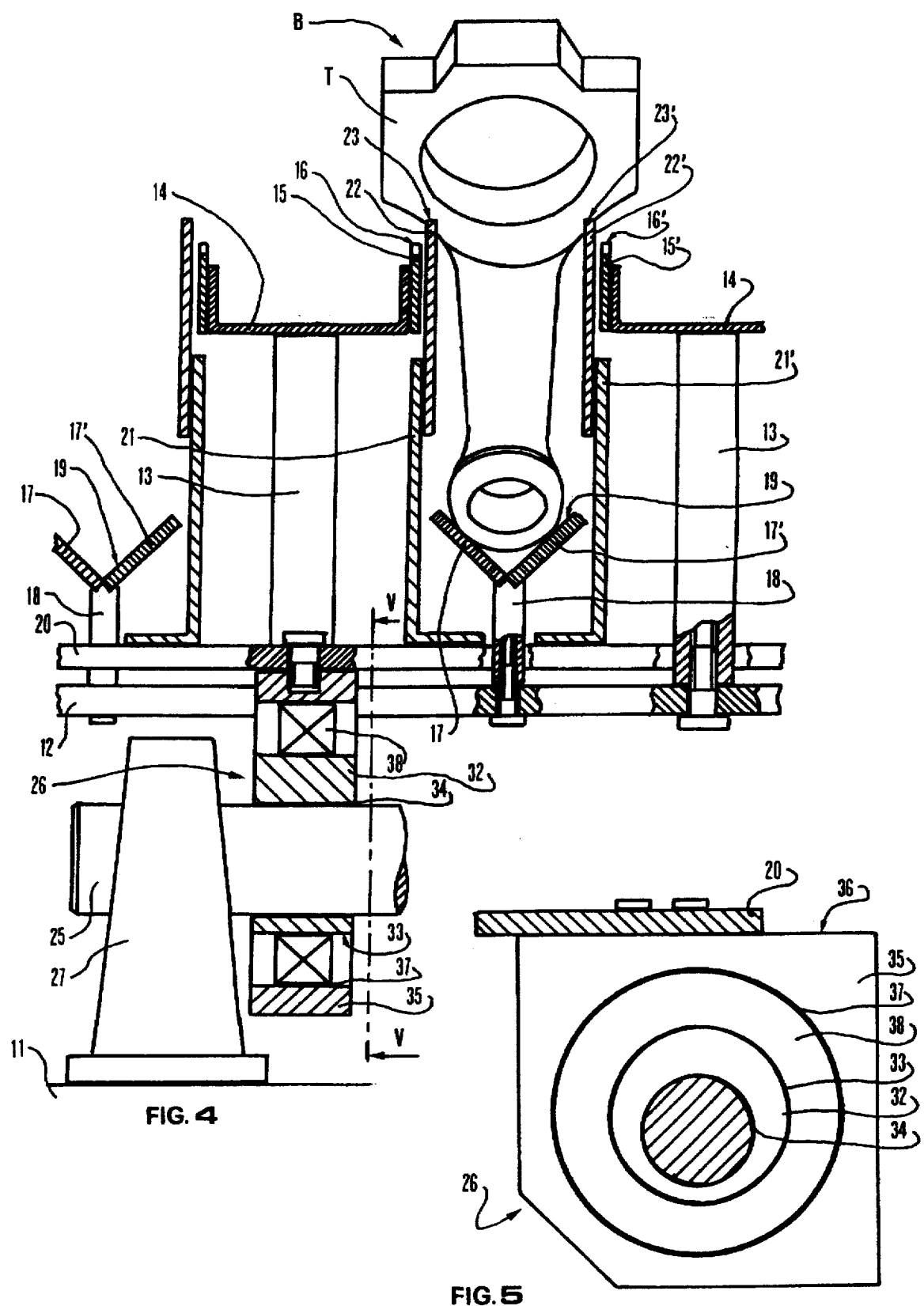
FIG. 4 is a partly cut-away cross-sectional view, enlarged and with some elements furtherly cross-sectioned, of a detail shown in FIG. 2.
FIG. 5 is a longitudinal cross-sectional view of a detail shown in FIG. 4, viewed along path V—V in FIG. 4.

The system, schematically shown in FIGS. 2, 3 and 4, comprises a certain number of apparatuses (for example, seven) for transporting elongated mechanical pieces (connecting rods B), with associated guides arranged along mutually parallel directions, and can be used, for example, even next to other similar systems, at the exit of a measuring machine, where every connecting rod is subject to dimensional checkings and, on the ground of the checkings carried out, is selectively loaded on one of the guides.

The system comprises a support structure with a bed 11 and support frames 12, 12' fixed with respect to bed 11. Longitudinal support means include uprights 3, coupled to frames 12, 12', supporting longitudinal beams 14 whereto there are fixed upper supporting bars 15, 15' for the connecting rods B. The supporting bars 15, 15' define upper resting surfaces 16, 16' with sawtooth profile for the resting of the larger end portions, or big ends, T of pieces B. The sawtooth profile of the surfaces 16, 16' defines mechanical references for the pieces B, preventing them from sliding on these surfaces.

Guiding elements, for limiting the transversal displacements of the connecting rods B during their transport, comprise pairs of longitudinal bars 17, 17' coupled to the frames 12, 12' by means of stanchions 18. The bars 17, 17' of each pair are mutually sloping and their internal sides define a lower resting and constraint surface 19 with a Vee cross-section that lies in a lower position between a pair of upper supporting bars 15, 15' and forms a longitudinal guide for the resting of the second end portions, or small ends, P of connecting rods B. An inclined limit-stop element 40 (FIG. 3) is fixed to each pair of upper bars 15, 15' at an end of these bars 15, 15'.

Elongated transversal members or plates 20, 20' carry pairs of longitudinal flat bars 21, 21', vertically arranged, that bear at their upper ends feeding bars 22, 22' with associated upper feeding surfaces 23, 23'.

Driving devices comprise an electric motor 24, and mechanical transmission elements with two transversal rotating shafts 25, 25' and transmission devices 26. Each of the shafts 25, 25' is coupled, by means of bearings not shown in the drawing that enable the shafts to rotate about mutually parallel transversal axes, to supports 27, 28 and 29 that are in turn fixed to bed 11. The electric motor 24 is also coupled to bed 11 and a pulley system, schematically shown and identified by reference number 30 in the drawings, provides the coupling between the motor 24 and the shaft 25. A second pulley system 3 features the coupling between the shafts 25 and 25'.

Four transmission devices 26 are coupled, two by two, to both the shafts 25, 25' and the elongated plates 20, 20'. Each of these devices 26 (see FIGS. 4 and 5) comprises an element 32 with an external cylindrical surface 33 and a cylindrical hole 34, eccentric with respect to the surface 33, for the passage of shaft 25. Element 32 is coupled in a fixed way (with known elements, not shown in the figures, comprising, for example, a key) to shaft 25. Moreover, each device 26 comprises a non-rotating element 35 with a flat portion 36, fixed to the elongated plates 20, and a cylindrical hole 37. A rotatable bearing, e.g. a ball bearing 38, inserted in hole 37, couples element 35 to element 32 in correspondence with the cylindrical external surface 33, to permit mutual rotation between elements 32 and 35.

The operation of the described apparatus is the following. By means of the pulley system 30, motor 24 causes shaft 25 to rotate about its axis and, by virtue of the pulley system 31, there occurs an identical axial rotation of shaft 25'. By means of the rotation of elements 32 and the consequent eccentric rotation of the associated external surfaces 33, the transmission devices 26 cause the non-rotating elements 35 and the plates 20, 20' integral to them to perform cyclic displacements. The configuration of the various elements forming the four devices 26 is such that the action of the devices 26 occurs in a synchronous way on plates 20, 20', by transmitting to the latter a translation displacement along a substantially circular trajectory. This displacement is transmitted, through the pairs of flat bars 21, 21', to the feeding bars 22, 22' that are substantially parallel to the upper supporting bars 15, 15' and that keep themselves aligned along horizontal parallel directions in the course of the translation displacement.

A connecting rod B, for example after undergoing a series of dimensional checkings on a measuring machine, is placed at an end of a transporting apparatus, in the position shown, for example, by connecting rod B1 in FIG. 3. The big end T1 rests on the upper surfaces 16, 16', positioned by the teeth of the sawtooth profiles, while the small end P1 rests on the lower surface 19, and the connecting rod positions itself substantially on a sloping plane with respect to the feed direction (FIG. 3).

In the course of the cyclic displacements of the feeding bars 22, 22' the associated upper feeding surfaces 23, 23' raise (FIG. 2), bring forward the big end T of the connecting rod B and place it on the sawtooth surfaces 16, 16' again, along the longitudinal feed direction. In the course of the displacement of the big end T, the little end P remains in contact with the Vee lower surface 19, slides on it, and the sloping angle of the connecting rod B with respect to the feed direction varies in a substantially cyclic way.

All the connecting rods B on the transporting apparatus are simultaneously brought forward by the feeding bars 22, 22', by means of subsequent steps like the previously described one, until they contact the inclined limit-stop element 40, or other connecting rods B2 that are prevented from feeding by this limit-stop element 40.

The sawtooth profile of the resting surfaces 16, 16' enables to define the longitudinal position of the big end T at every step of the feed, and prevents the connecting rod B from sliding on the resting surfaces 16, 16', rotating about its longitudinal geometric axis and falling through the upper bars 15, 15'. In this way there is no need for a guide device acting also as an antirotation device for guiding the pieces B with an extremely limited clearance. Consequently, the apparatus can be utilized for transporting connecting rods B with nominal dimensions (diameters, thicknesses, centre distances) that differ within a rather broad range, without there being the need of performing, as these dimensions vary, any adjustment operations. To this purpose it should be realized that the sloping bars 17, 17' define a constraint surface 19 and a guide for connecting rods B differing in dimensions; thus, in practice, just the sloping angles of the connecting rods B differ as the piece dimensions vary, without affecting in any way the correct transporting operations of the apparatus.

Obviously, apparatuses according to the invention can be utilized for transporting mechanical pieces of other types, with respect to the herein described and illustrated connecting rods B, provided that the geometric characteristics of the pieces enable the resting and the feed in the afore described way.

The present invention covers apparatuses manufactured according to different constructional details with respect to those hereinbefore described and illustrated insofar as the cyclic motion of the feeding bars 22, 22', for example, is concerned, that can occur by following a different trajectory with respect to the circular one (for example a quadrilateral one).

According to another possible variant to the afore described and illustrated apparatus there can be provided a sawtooth profile for the feeding surfaces 23, 23' too, instead of a plane profile like the one shown in the figures.

We claim:

1. Apparatus for transporting elongated mechanical pieces having one larger end (T), in particular for transporting connecting rods (B) along at least a longitudinal feeding direction, comprising a support structure (11,12,12'), a pair of upper supporting bars (15,15') coupled to the support structure (11,12,12'), the supporting bars being mutually parallel and defining upper resting surfaces (16,16'), for supporting the larger ends (T) of the mechanical pieces (B), lower longitudinal guiding elements (17,17') coupled to the support structure (11,12,12') and arranged between the upper bars (15,15') and beneath them, for defining constraint surfaces (19) for cooperating along transversal directions with second end portions (P) of the mechanical pieces (B), a pair of feeding bars (22,22'), parallel to the supporting bars (15,15'), for performing cyclic displacements with respect to the support structure (11,12,12') and cooperating with the mechanical pieces (B), and at least one motor (24) and mechanical transmission elements (25–38) coupled to the feeding bars (22,22') for controlling said cyclic displacements, characterized in that said lower longitudinal guiding elements (17, 17') define a lower resting surface (19) with a substantially Vee cross-section, that defines the constraint surfaces (19) and said upper resting surfaces (16,16') define mechanical references for determining the longitudinal position of the larger ends (T) of the pieces (B) on the upper supporting bars (15,15').

2. An apparatus according to claim 1, wherein said resting surfaces (16,16') have a substantially sawtooth profile for defining said mechanical references.

3. An apparatus according to claim 2, wherein said lower longitudinal guiding elements comprise at least a pair of mutually sloping longitudinal bars (17,17') for defining the lower resting surface (19) with Vee cross-section.

4. An apparatus according to claim 3, wherein the feeding bars. (22,22') define upper feeding surfaces (23,23') for cooperating with the mechanical pieces (B) in correspondence with said larger ends (T).

5. An apparatus according to claim 4, wherein said at least one motor (24) and mechanical transmission elements (25–38) are adapted to control and transmit to the feeding bars (22,22') a translation displacement along a substantially circular trajectory.

6. An apparatus according to claim 5, wherein the feeding bars (22,22') are arranged between the upper supporting bars (15,15').

7. Apparatus for transporting connecting rods (B) along a plurality of horizontal and parallel feeding paths, the connecting rods including big ends (T) and small ends (P) and defining a longitudinal geometric axis, comprising:

a support structure (11,12,12');

a plurality of pairs of horizontal and parallel supporting bars (15,15') fixed to the support structure (11,12,12') and defining mechanical references (16,16') for supporting aid big ends (T) and preventing the connecting rods (B) from rotating about their geometric axes;

a plurality of guiding bars (17,17'), each arranged below and between, and parallel to, a corresponding pair of said supporting bars (15,15'), the guiding bars defining inclined sides (19) for cooperating with and providing transversal constraint to said small ends (P), the guiding bars being arranged at a distance, along a vertical direction, from the corresponding supporting bars, such that the connecting rods (B) being supported by corresponding supporting bars and guiding bars are inclined to said vertical direction;

a plurality of mutually coupled pairs of horizontal feeding bars (22,22') parallel to the supporting bars (15,15') and movable with respect to said support structure (11,12, 12'), for sequentially and step by step lifting the connecting rods (B) from said supporting bars, feeding them along said paths, and place them again onto the supporting bars; and driving devices arranged between the support structure (11,12,12') and the feeding bars (22,22') and including a motor (24), at least one rotating shaft (25) coupled to the motor, and transmission devices coupled to said at least one shaft, the transmission devices including eccentric elements (32) rotating with said at least one shaft and non-rotating connection elements (35) coupled to said eccentric elements and feeding bars.

8. An apparatus according to claim 7, wherein said supporting bars (15,15') have sawtooth profiles defining said mechanical references (16,16') and said guiding-bars (17, 17') have a Vee cross-section for defining said inclined sides (19), and wherein each pair of said feeding bars (22,22') is arranged, and movable by said driving devices (24,25,32, 35), between a corresponding pair of supporting bars (15, 15').

9. An apparatus according to claim 8, wherein said driving devices include transversal members (20,20') for fixing the feeding bars (22,22') to each other and rotatable bearings (38) arranged between said eccentric elements (2) and non-rotating elements (35), for transforming rotational displacements of said at least one rotating shaft (25) into translation displacements of said feeding bars along a substantially circular trajectory.

* * * * *

UNITED STATES PATENT AND TRADEMARK OFFICE
CERTIFICATE OF CORRECTION

PATENT NO. : 5,727,673
DATED : 3/17/98
INVENTOR(S) : Luca Gabbi et al.

It is certified that error appears in the above-identified patent and that said Letters Patent is hereby corrected as shown below:

In column 1, 1.64, a comma should be added after "stops,".
In column 2, 1.26, "o" should be --so--;
In column 3, 1.6, "3" should be --13--;
In column 3, 1.41, "3" should be --31--;
In column 4, 1.15, --B1-- should be added after "rod";
In column 6, 1.9, "aid" should be --said--;
In column 6, 1.47, "(2)" should be --(32)--.

Signed and Sealed this

Ninth Day of June, 1998

*Attest:*

BRUCE LEHMAN

*Attesting Officer*  *Commissioner of Patents and Trademarks*